United States Patent
Park et al.

(10) Patent No.: US 11,082,113 B2
(45) Date of Patent: Aug. 3, 2021

(54) METHOD FOR PERFORMING TRAINING FOR SIGNAL BEAMFORMING IN WIRELESS LAN SYSTEM, AND DEVICE FOR SAME

(71) Applicant: LG ELECTRONICS INC., Seoul (KR)

(72) Inventors: Sungjin Park, Seoul (KR); Jinmin Kim, Seoul (KR); Sunwoong Yun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 16/611,194

(22) PCT Filed: May 3, 2018

(86) PCT No.: PCT/KR2018/005142
§ 371 (c)(1),
(2) Date: Nov. 5, 2019

(87) PCT Pub. No.: WO2018/203683
PCT Pub. Date: Nov. 8, 2018

(65) Prior Publication Data
US 2020/0162146 A1    May 21, 2020

Related U.S. Application Data

(60) Provisional application No. 62/501,797, filed on May 5, 2017, provisional application No. 62/501,793, filed
(Continued)

(51) Int. Cl.
*H04B 7/06* (2006.01)
*H04B 7/0417* (2017.01)
(Continued)

(52) U.S. Cl.
CPC ......... *H04B 7/0684* (2013.01); *H04B 7/0417* (2013.01); *H04B 7/0617* (2013.01);
(Continued)

(58) Field of Classification Search
None
See application file for complete search history.

(56) References Cited

U.S. PATENT DOCUMENTS 10,742,285 B1 * 8/2020 Chu ..................... H04B 7/0695
2015/0244432 A1    8/2015 Wang
(Continued)

FOREIGN PATENT DOCUMENTS

WO    2016179100    11/2016
WO    2017011211    1/2017

OTHER PUBLICATIONS

PCT International Application No. PCT/KR2018/005142, International Search Report dated Aug. 29, 2018, 4 pages.
(Continued)

*Primary Examiner* — Otis L Thompson, Jr.
(74) *Attorney, Agent, or Firm* — Lee Hong Degerman Kang Waimey

(57) ABSTRACT

Presented in the present specification are a method whereby a station performs beamforming training in a wireless LAN (WLAN) system, and a device for same. In particular, presented in the present specification are a method whereby a station performs beamforming training for frequency division multiple access (FDMA) transmission, and a device for same. The method according to the present specification comprises the steps of: transmitting a beamforming setup frame including beamforming training operation information and identification information on one or more second stations corresponding to one FDMA group; performing FDMA beamforming training by using multiple transmis-
(Continued)

sion sectors simultaneously on the basis of the beamforming training operation information; receiving a feedback result of the performed FDMA beamforming training from the one or more second stations; and transmitting a selection frame including channel allocation information for each station and FDMA transmission configuration information determined on the basis of the received feedback result.

13 Claims, 25 Drawing Sheets

Related U.S. Application Data on May 5, 2017, provisional application No. 62/501,761, filed on May 5, 2017, provisional application No. 62/501,762, filed on May 5, 2017.

(51) Int. Cl.
*H04B 7/26* (2006.01)
*H04W 84/12* (2009.01)

(52) U.S. Cl.
CPC ......... *H04B 7/0695* (2013.01); *H04B 7/2615* (2013.01); *H04W 84/12* (2013.01)

(56) References Cited

U.S. PATENT DOCUMENTS

| 2016/0043787 A1* | 2/2016 | Lee ..................... H04B 7/0626 370/329 |
| 2016/0323755 A1 | 11/2016 | Cordeiro et al. |
| 2017/0033850 A1* | 2/2017 | Kasher ................ H04B 7/0452 |
| 2018/0198506 A1* | 7/2018 | Sanderovich .......... H04B 7/063 |

OTHER PUBLICATIONS

Agilent Technologies, "Understanding IEEE 802.11ad Physical Layer and Measurement Challenges," Retrieved from the Internet, May 2014, 68 pages.

* cited by examiner

FIG. 9

| CH1z | L-STF | L-CE | L-Header | ay Header A | ay STF | ay CE | ay Header B | ay payload |
|------|-------|------|----------|-------------|--------|-------|-------------|------------|
|      | GF-STF | GF-CE | | | | | | |
| CH 2 | L-STF | L-CE | L-Header | ay Header A | | | | |

(L: Legacy, GF: Gap filling, ay: 802.11ay)

FIG. 12

| Element ID | Length | Element ID Extension | Core Capabilities | Extended Capabilities 1 | ... | Extended Capabilities N |
|---|---|---|---|---|---|---|
| Octets: 1 | 1 | 1 | 3 | Variable | | Variable |

FIG. 13

| Capabilities ID | Capabilities Length | Capabilities Payload |
|---|---|---|
| 1 | 1 | Variable |

Octets:

FIG. 14

| B0 B4 | B5 | B6 | B7 | B8 | | B9 B15 |
|---|---|---|---|---|---|---|
| Requested BRP SC Blocks | MU-MIMO Supported | MU-MIMO Supported | Grant Required | No RSS Supported | FDMA Supported | Reserved |
| Bits: 5 | 1 | 1 | 1 | 1 | 1 | 6 |

FIG. 16

| Element ID | Length | Element ID Extension | Number of EDMG Groups | EDMG Group 1 | ... | EDMG Group N |
|---|---|---|---|---|---|---|
| Octets: 1 | 1 | 1 | 1 | 5 | ... | 5 |

EDMG FDMA Group ID Set element format

| EDMG Group ID | AID 0 | AID 1 | AID 2 | AID 3 |
|---|---|---|---|---|
| Octets: 1 | 1 | 1 | 1 | 1 |

EDMG FDMA Group field format

FIG. 17

| Element ID | Length | Element ID Extension | Number of EDMG Groups | EDMG Group 1 | ... | EDMG Group N |
|---|---|---|---|---|---|---|
| Octets: 1 | 1 | 1 | 1 | 9 | ... | 9 |

FIG. 18

| EDMG Group ID | AID 0 | AID 1 | ... | AID 7 |
|---|---|---|---|---|
| 1 | 1 | 1 | ... | 1 |

Octets:

FIG. 21

| CH1 (Primary) | L-STF | L-CE | L-Header | EDMG Header A | BRP | (EDMG) TRN |
|---|---|---|---|---|---|---|
| CH2 | L-STF | L-CE | L-Header | EDMG Header A | BRP | |

METHOD FOR PERFORMING TRAINING FOR SIGNAL BEAMFORMING IN WIRELESS LAN SYSTEM, AND DEVICE FOR SAME

CROSS-REFERENCE TO RELATED APPLICATIONS

This application is the National Stage filing under 35 U.S.C. 371 of International Application No. PCT/KR2018/005142, filed on May 3, 2018, which claims the benefit of U.S. Provisional Application No. 62/501,797, filed on May 5, 2017, 62/501,793, filed on May 5, 2017, 62/501,761, filed on May 5, 2017, and 62/501,762, filed on May 5, 2017, the contents of which are all hereby incorporated by reference herein in their entirety.

BACKGROUND

Technical Field

The present description relates to a method for performing, by a station, beamforming training in a wireless LAN (WLAN) system, and a device for the same.

More particularly, the present description relates to a method for performing, by a station, beamforming training for frequency division multiple access (FDMA) transmission, and a device for the same.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY

The present disclosure provides a method for performing, by a station, beam training for frequency division multiple access (FDMA) transmission, and a device for the same.

In an aspect, there is provided a method for performing, by a first station (STA), beamforming training frequency division multiple access (FDMA) transmission to one or more second STAs, the method including transmitting a beamforming setup frame including identification information of one or more second STAs corresponding to one FDMA group and beamforming training operation information; based on the beamforming training operation information, performing FDMA beamforming training by simultaneously using a plurality of transmission sectors, receiving a feedback result of the FDMA beamforming training from the one or more second STAs, and transmitting a selection frame including FDMA transmission setup information and channel allocation information for each STA that are determined based on the received feedback result.

The identification information for the one or more second STAs may include association identifies (AIDs) of the one or more second STAs or partial AIDs of the one or more second STAs.

The beamforming training operation information may include beamforming training order information for each combination of the plurality of transmission sectors to be used simultaneously.

The beamforming setup frame may further include training type indication information indicating that beamforming training performed based on the beamforming setup frame is a beamforming training process for FDMA, and channel, resource unit (RU), or bandwidth information corresponding to the identification information of the one or more second STAs.

The FDMA beamforming training may be performed through transmission of a beam refinement protocol (BRP) frame including a training field.

The training field in the BRP frame may be transmitted in a duplicated mode for each channel.

The training field in the BRP frame may be transmitted through a plurality of bonded channels.

The plurality of transmission sectors to be used simultaneously may be controlled through one radio frequency (RF) chain.

The plurality of transmission sectors to be used simultaneously may be controlled through RF chains corresponding thereto.

The method may further include transmitting a poll frame to request a feedback result of the FDMA beamforming training from the one or more second STAs.

The FDMA transmission setup information may include information indicating one or more third STAs participating in FDMA transmission.

The first STA may correspond to a personal basic service set central point/access point (PCP/AP).

When a fourth STA with a plurality of channels allocated thereto is included in the one or more second STAs, a feedback result received from the fourth STA may include feedback results for the respective channels allocated to the fourth STA.

In another aspect, there is provided a station device for performing beamforming training for frequency division multiple access (FDMA) transmission in a wireless LAN (WLAN) system, the device including a transceiver having one or more radio frequency (RF) chains and configured to transmit and receive signals with one or more other station devices, and a processor connected to the transceiver to process the signals transmitted and received with the one or more other station devices. The processor may be configured to transmit a beamforming setup frame including identification information of the one or more other STAs corresponding to one FDMA group and beamforming training operation information, based on the beamforming training operation information, perform FDMA beamforming training by simultaneously using a plurality of transmission sectors, receive a feedback result of the FDMA beamforming training from the one or more other STAs, and transmit a selection frame, including FDMA transmission setup information and channel allocation information for each STA that are determined based on the received feedback result.

Effects obtainable from the present disclosure may be non-limited by the above mentioned effect, and other unmentioned effects may be clearly understood from the following description by those having ordinary skill in the technical field to which the present disclosure pertains.

Through the above configuration, it is possible for a station device according to the present disclosure to perform beamforming training for frequency division multiple access (FDMA) transmission.

Effects obtainable from the present disclosure may be non-limited by the above mentioned effect, and other unmentioned effects may be clearly understood from the following description by those having ordinary skill in the technical field to which the present disclosure pertains.

BRIEF DESCRIPTION OF THE DRAWINGS

The accompanying drawings, which are included to provide a further understanding of the disclosure, illustrate embodiments of the disclosure and together with the description serve to explain the principle of the disclosure.

FIG. 9 is a diagram showing a PPDU structure that can be applied to the present disclosure.

FIG. 12 is a diagram showing an EEDMG Capabilities element format that can be applied to the present disclosure, and FIG. 13 is a diagram showing an Extended Capabilities field format.

FIG. 14 is a diagram showing a Beamforming Capability field format that can be applied to the present disclosure.

FIG. 16 is a diagram showing an EDMG FDMA Group ID set element format and an EDMDG FDMA Group field format that can be applied to the present disclosure.

FIG. 17 is a diagram showing an EDMG Group ID Set element format that can be applied to the present disclosure, and FIG. 18 is a diagram showing an EDMG Group field format that can be applied to the present disclosure.

FIG. 21 is a diagram schematically showing a beam refinement protocol (BRP) frame for performing FDMA beamforming between a PCP/AP and an STA according to the present disclosure.

DESCRIPTION OF EXEMPLARY EMBODIMENTS

Hereinafter, the preferred embodiment of the present disclosure will be described in detail with reference to the appended drawings. The detailed description that will hereinafter be disclosed along with the appended drawings will only be provided to describe an exemplary embodiment of the present disclosure. And, therefore, it should be understood that the exemplary embodiment presented herein will not represent the only embodiment for carrying out the present disclosure.

The following detailed description includes specific details for providing a full understanding of the present disclosure. However, it will be apparent to anyone skilled in the art that the present disclosure can be carried out without referring to the above-mentioned specific details. In some cases, in order to avoid any ambiguity in the concept of the present disclosure, the disclosed structure and device may be omitted, or the disclosed structure and device may be illustrated as a block diagram based on their core functions.

Although diverse mobile communication systems applying the present disclosure may exist, a wireless LAN (WLAN) system will hereinafter be described in detail as an example of such mobile communication system.

1. Wireless LAN (WLAN) System 1-1. General Wireless LAN (WLAN) System

Figure 1:
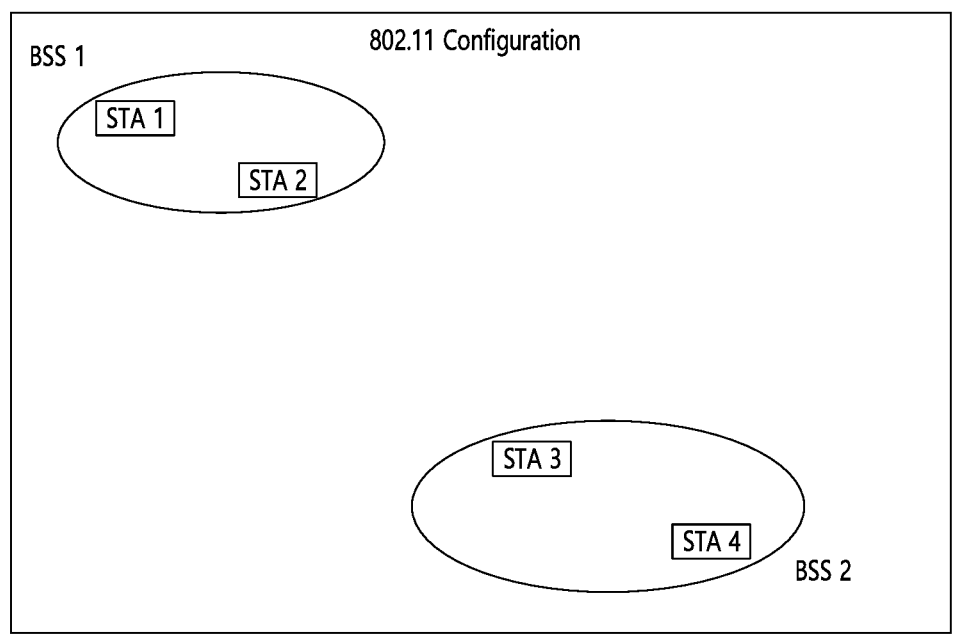
FIG. 1 is a diagram showing an exemplary configuration of a wireless LAN (WLAN) system

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
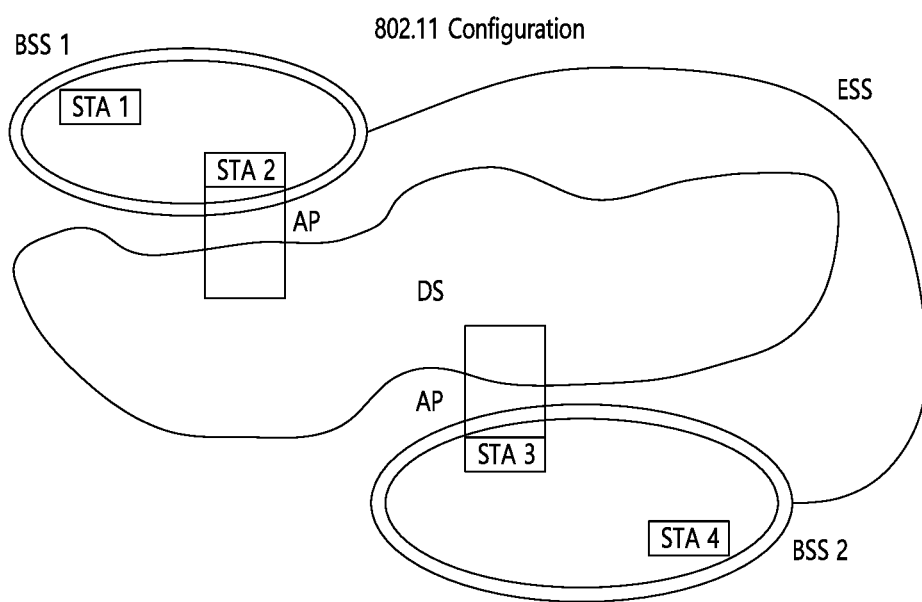
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
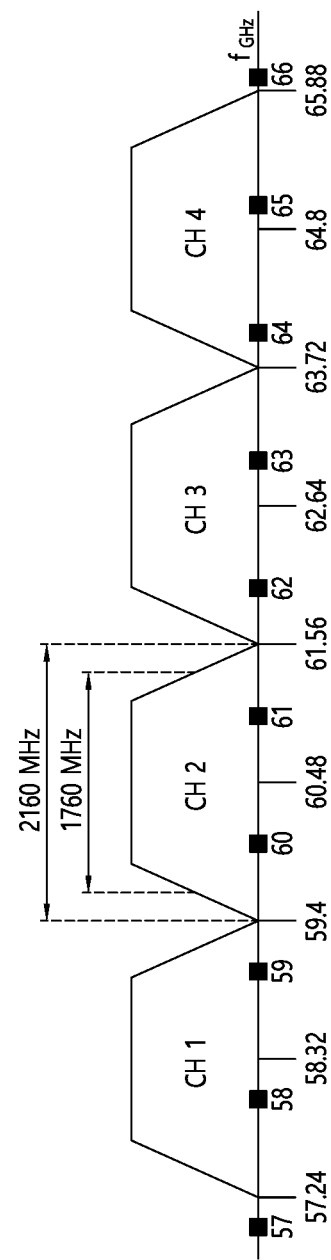
FIG. 3 is a diagram describing a channel in a 60 GHz band for describing a channel bonding operation according to an exemplary embodiment of the present disclosure.

FIG. 3 is a diagram describing a channel in a 60 GHz band for describing a channel bonding operation according to an exemplary embodiment of the present disclosure.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present disclosure will not be limited to only one or more specific channels.

Figure 4:
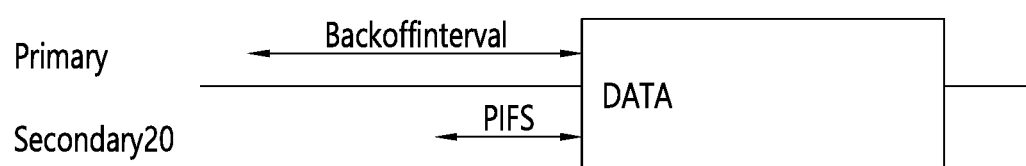
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present disclosure, a solution (or method) for performing scheduling-based access by having the AP transmit scheduling information to the STAs is proposed. Meanwhile, in another aspect of the present disclosure, a solution (or method) for performing contention-based channel access based on the above-described scheduling or independently from the above-described scheduling is proposed. Furthermore, in yet another aspect of the present disclosure, a method for performing communication through a spatial sharing technique based on beamforming is proposed.

1-3. Beacon Interval Configuration

Figure 5:
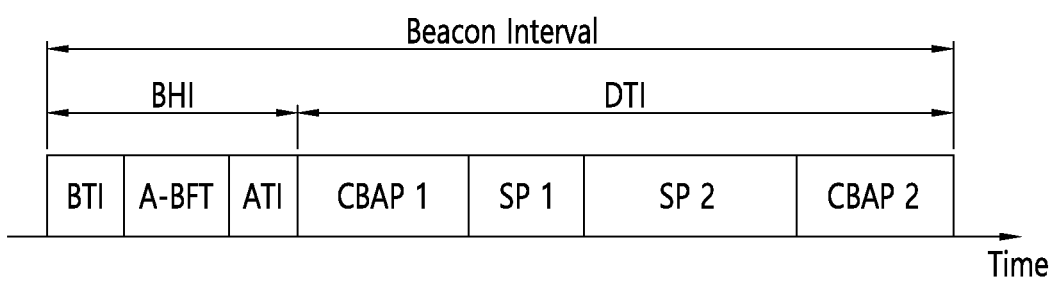
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present disclosure is not necessarily required to be limited only to this.

Hereinafter, a physical layer configuration in a wireless LAN (WLAN) system, in which the present disclosure is to be applied, will be described in detail.

1-4. Physical Layer Configuration

It will be assumed that the wireless LAN (WLAN) system according to an exemplary embodiment of the present disclosure may provide 3 different modulations mode as shown below.

TABLE 1

| PHY | MCS | Note |
|---|---|---|
| Control PHY | 0 | |
| Single carrier PHY (SC PHY) | 1 ... 12 25 ... 31 | (low power SC PHY) |
| OFDM PHY | 13 ... 24 | |

Such modulation modes may be used for satisfying different requirements (e.g., high throughput or stability). Depending upon the system, among the modulation modes presented above, only some of the modulation modes may be supported.

Figure 6:
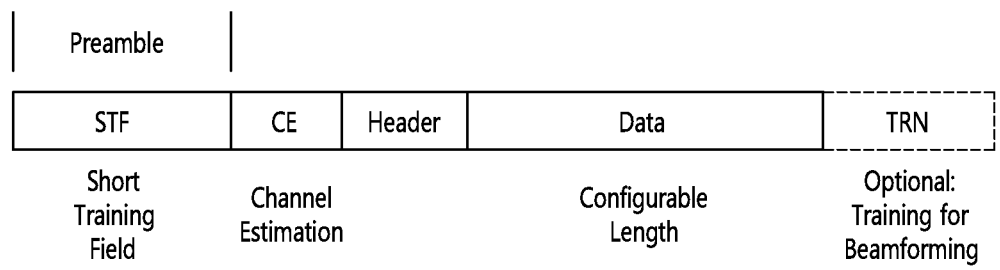
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
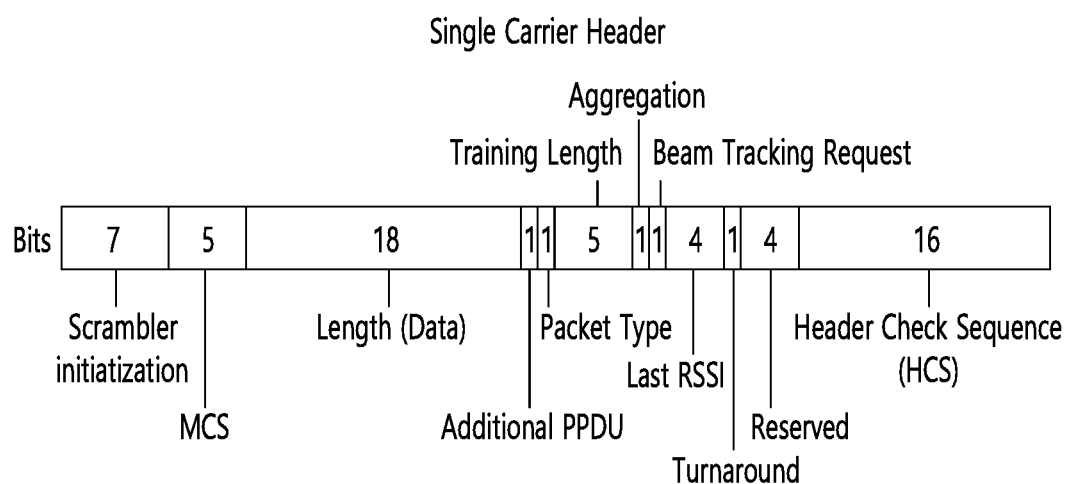
FIG. 7 and FIG. 8 are diagrams describing a configuration of a header field of the radio frame shown in FIG. 6.
Figure 8:
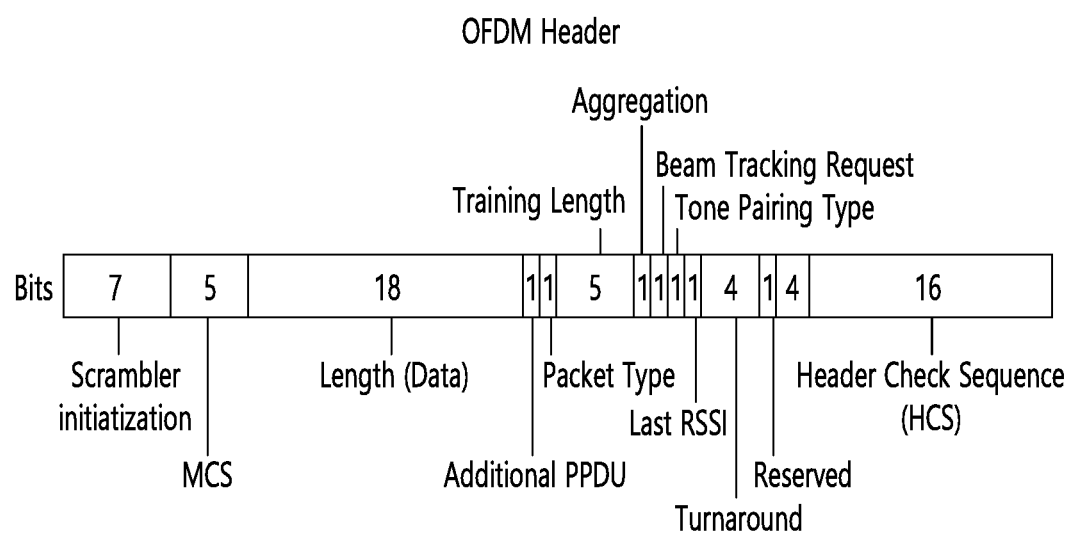

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11 ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present disclosure. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present disclosure, it may be considered to perform the transmission (gap filling) of a new STF and CE field along with the legacy preamble at the same time through the 400 MHz band between each channel.

In this case, as shown in FIG. 9, the PPDU structure according to the present disclosure has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
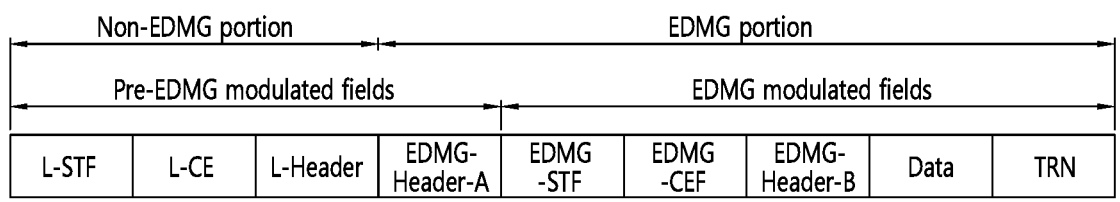
FIG. 10 is a diagram showing a simple PPDU structure that can be applied to the present disclosure.

FIG. 10 is a diagram showing a simple PPDU structure that can be applied to the present disclosure. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble part of the PPDU may be used for packet detection, automatic gain control (AGC), frequency offset estimation, synchronization, indication of modulation (SC or OFDM), and channel estimation. A format of the preamble may be common to both OFDM packets and SC packets. Here, the preamble may include a short training field (STF) and a channel estimation (CE) field.

2. Embodiment that can be Applied to the Present Disclosure

Hereinafter, based on the aforementioned configurations, a series of operations for a frequency division multiple access (FDMA) scheme will be described in detail.

2.1. FDMA Capability Negotiation

In this chapter, a method in which STAs capable of performing FDMA transmission and reception exchange information for supporting FDMA with each other in an association process prior to actual beamforming and resource allocation will be described.

(1) Informing Whether a STA Supports FDMA Scheme

Figure 11:
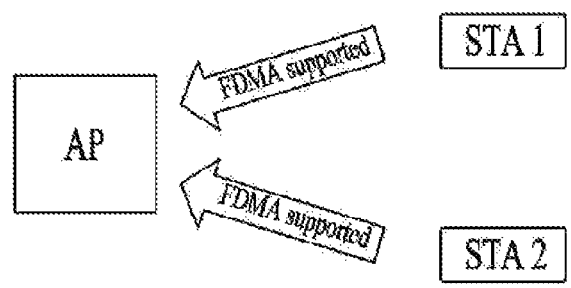
FIG. 11 is a diagram showing an operation in which information on whether STAs support FDMA is transmitted to a personal basic service set central point/access point (PCP/AP) according to the present disclosure.

FIG. 11 is a diagram showing an operation in which information on whether STAs support FDMA is transmitted to a PCP/AP according to the present disclosure.

As illustrated in FIG. 1, the STAs may inform that it is possible to decode only resource units allocated to the STAs. To this end, the STAs may inform the PCP/AP of the respective RU sizes thereof through bandwidth capability negotiation and the like.

FIG. 12 is a diagram showing an EDMG Capabilities element format that can be applied to the present disclosure, and FIG. 13 is a diagram showing an Extended Capabilities field format.

Capabilities IDs in FIG. 13 may be classified as in the following table.

TABLE 2

| Capability | Capabilities ID |
| --- | --- |
| Beamforming | 0 |
| Multi-BF | 1 |
| Antenna Polarization Capability | 2 |
| PHY Capability | 3 |
| Supported Channels | 4 |

Here, a Beamforming Capability field format may be expressed as in FIG. 14.

FIG. 14 is a diagram showing a Beamforming Capability field format that can be applied to the present disclosure.

An STA may transmit an EDMG Capabilities element to a PCP/AP using a management frame. In this case, the STA may transmit an FDMA Supported field using a reserved bit (e.g., 1 bit). If the FDMA Supported field has a value of 1, the FDMA Supported field may indicate that the STA is an STA supporting FDMA. If the FDMA Supported field has a value of 0, the FDMA Supported field may indicate that the STA is an STA not supporting FDMA.

(2) FDMA Group Information.

Figure 15:
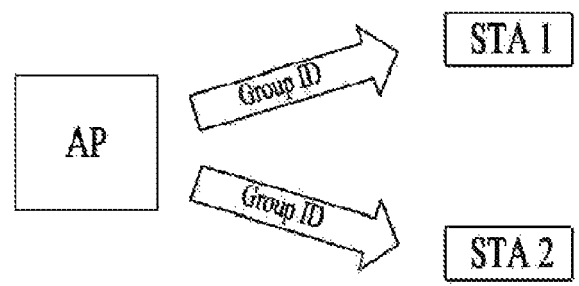
FIG. 15 is a diagram showing an operation in which a PCP/AP transmits a frequency division multiple access (FDMA) group information to stations (STAs) according to the present disclosure.

FIG. 15 is a diagram showing an operation in which a PCP/AP transmits FDMA group information to STAs.

The PCP/AP may transmit a beacon or announce frame to the STAs in a basic service set (BSS). In this case, the PCP/AP may inform an FDMA group ID and which STAs' Associated IDs (AID) are included in the corresponding FDMA group ID.

The PCP/AP may transmit the FDMA group ID through the beacon or the announce frame in a manner described below.

1) Method for Newly Defining EDMG FDMA Group ID Set Elements

TABLE 3

| Order | Information | Notes |
| --- | --- | --- |
| <Last-5> | EDMG Capabilities | Optionally present if transmitted by an EDMG STA |
| <Last-4> | EDMG Operation | Optionally present if transmitted by an EDMG STA |
| <Last-3> | EDMG Extended Schedule | Optionally present if transmitted by an EDMG STA |
| <Last-2> | EDMG Group ID Set | Optionally present if transmitted by an EDMG STA |
|  | EDMG FDMA Group ID Set | Optionally present if transmitted by an EDMG STA |
| <Last-1> | EDMG Training Field Schedule | Optionally present if transmitted by an EDMG STA |

As shown in the above table, EDMG FDMA Group ID set elements may be newly defined in Element ID extension. In this case, an EDMG FDMA Group ID set element format and an EDMDG FDMA Group field format may be configured as shown in FIG. 16.

FIG. 16 is a diagram showing an EDMG FDMA Group ID set element format and an EDMDG FDMA Group field format that can be applied to the present disclosure.

In the 802.11ay system to which the present disclosure can be applied, it is possible to support channel bonding of up to four channels. Accordingly, up to four STAs may form one group, as shown in FIG. 16.

2) Method for Using EDMG-Group ID Set Elements for MU-MIMO in Combination

EDMG Group ID set elements for MU-MIMO may be used as a Group ID for FDMA.

Figure 18:
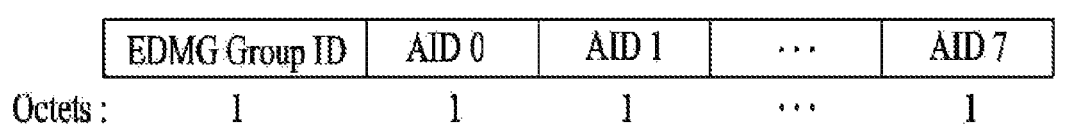

FIG. 17 is a diagram showing an EDMG Group ID Set element format that can be applied to the present disclosure, and FIG. 18 is a diagram showing an EDMG Group field format that can be applied to the present disclosure.

In this case, one group may be comprised of up to eight STAs. As for an FDMA group, an AID field for four or more STAs may be reserved.

2.2. FDMA Beamforming Procedure

In this chapter, a beamforming method performed by STAs for FDMA transmission will be described.

In the present disclosure, an FDMA RU unit may be set on a channel unit basis. Accordingly, in the 802.11ay system to which the present disclosure is applicable, it is possible to support RUs with size of 2.16 GHz, 4.32 GHz, 6.48 GHz, and 8.64 GHz.

In order for an STA participating in FDMA to transmit and receive data based on FDMA through an RU that is a channel unit, the STA may perform beamforming for a corresponding channel.

(1) FDMA BF Setup

Figure 19:
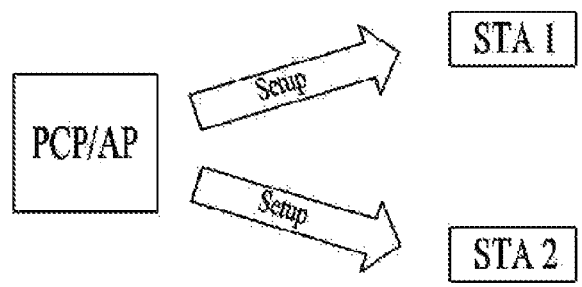
FIG. 19 is a diagram showing an operation in which a PCP/AP transmits a beamforming (BR) setup frame according to the present disclosure.

FIG. 19 is a diagram showing an operation in which a PCP/AP transmits a BF setup frame according to the present disclosure.

As illustrated in FIG. 19, a PCP/AP may transmit a FDMA BF setup frame to STAs corresponding to an FDMA group.

In this case, the PCP/AP may inform the STAs of information, described as below, through the BF setup frame. In doing so, the STAs may set beamforming for FDMA.

AIDs of the respective STAs corresponding to the FDMA group, or partial AIDs of some of the respective STAs An indication that a subsequent beamforming operation is not an MU beamforming training process, but a beamforming training process for the FDMA (training type indication)

BW information matching each AID, which corresponds to through which channels or RUs the respective STAs perform beamforming training Information on a training order of combinations of TX sectors for discovering a beam pattern that may be used for actual FDMA transmission (FDMA beamforming training order). For example, the information may represent a combination order of the TX sectors. Accordingly, an STA may simultaneously use sector 2 and 11 when performing beamforming by use of a first TRN field, and the STA may simultaneously use sector 3 and 13 when performing beamforming by use of a second TRN field.

In general, the information may represent a combination order of multiple TX sectors. For example, the information may represent a combination order of the following TX sectors.

1st time: sector 2 & 11
2nd time: sector 3 & 12
. . .
Nth time: sector 7 & 16

In the following description, an operation applicable mainly to a downlink configuration will be described, but the corresponding operation may be applied to an uplink configuration in a similar manner.

Hereinafter, the PCP/AP and the STAs may perform FDMA beamforming.

(2) FDMA Beamforming Training

Figure 20:
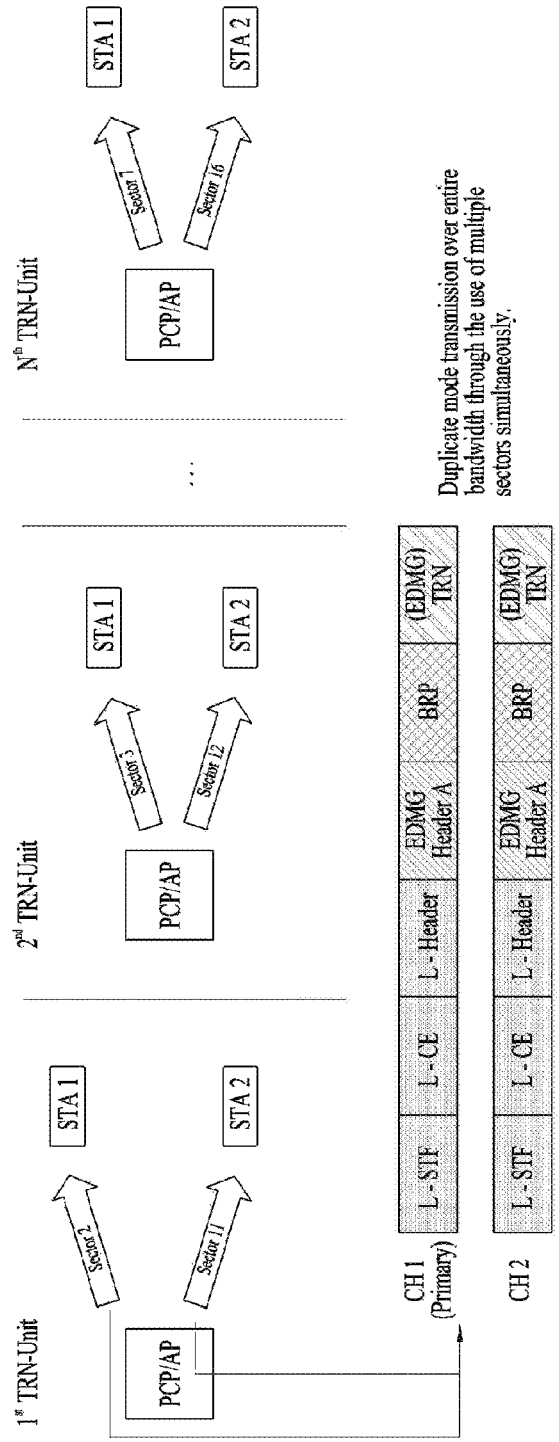
FIG. 20 is a diagram schematically showing an operation of performing FDMA beamforming between a PCP/AP and an STA according to the present disclosure.

FIG. 20 is a diagram schematically showing an operation of performing FDMA beamforming between a PCP/AP and an STA according to the present disclosure.

As illustrated in FIG. 20, a PCP/AP may perform FDMA beamforming training in accordance with a method set in a BF setup frame. In this case, the PCP/AP may perform the FDMA beamforming training by use of a beam refinement protocol (BRP) frame.

The PCP/AP may perform beamforming training by simultaneously using a plurality of sectors for one TRN-Unit transmission. In this case, each sector may be a sector capable of performing transmission and reception with respect to terminals corresponding to an FDMA group.

At this point, a BRP PPDU may be transmitted in a duplicate mode, as shown in FIG. 20.

FIG. 21 is a diagram schematically showing a BRP frame for performing FDMA beamforming between a PCP/AP and an STA according to the present disclosure.

In another example, as shown in FIG. 21, in order to measure information on each channel more thoroughly, a PPDU of which a TRN field is transmitted through a whole frequency band (e.g., a frequency band to which a plurality of channels is bonded) may be utilized, unlike FIG. 20.

As such, when a BRP packet is used for beamforming training, an entire beamforming training time may be reduced. At this point, the TRN field may be comprised of a plurality of TRN units (or TRN subfields).

In the above configuration, in order to transmit the BRP frame by simultaneously using a plurality of sectors, the PCP/AP may use one radio frequency (RF) panel or may use a plurality of RF panels matching per sector.

In this case, the PCP/AP may inform channel information, which is used for BRP packet transmission, through a bandwidth (BW) field and an aggregation field in EDMG Header A.

When the PCP/AP and an STA perform FDMA beamforming through the BRP packet transmission, the following method may be applied to allow only particular STAs to participate in the FDMA beamforming procedure.

A field indicating an FDMA group ID is newly defined in the BRP frame (that is, information indicating the FDMA group ID is included in a medium access control (MAC) frame body).

Four AID fields included in the FDMA EDMG Header A field are all set as a FDMA group ID (that is, information indicating an FDMA group ID is included in a PHY Header).

In the above case, a Responder Address (RA) field in the BRP frame may be set as a broadcast.

Alternatively, when the PCP/AP wishes to perform beamforming only for a particular STA, the PCP/AP may set the RA field of the BRP frame as a multi-cast by not using an AID but may configure the multi-cast by using MAC addresses of terminals corresponding to a FDMA group.

Through the above beamforming training, the PCP/AP may discover sectors capable of being transmitted and received with respect to each channel in relation with STAs belonging to a particular FDMA group and may simultaneously acquire signal to noise ratios (SNR) or received signal strength indicators (RSSI) values of the respective sectors.

2.3. Feedback for FDMA Beamforming Result

Figure 22:
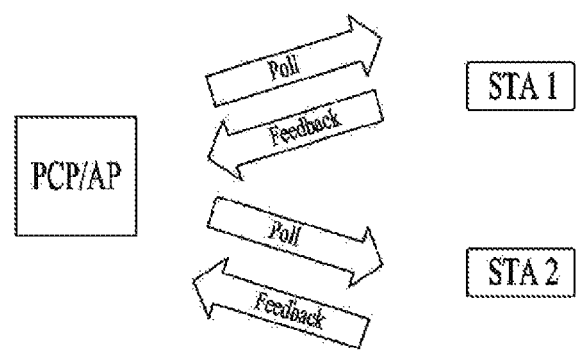
FIG. 22 is a diagram schematically showing an operation of performing FDMA beamforming feedback according to the present disclosure.

FIG. 22 is a diagram schematically showing an operation of performing FDMA beamforming feedback according to the present disclosure.

As shown in FIG. 22, a PCP/AP may request a FDMA beamforming training result by transmitting a pool frame to each STA to. In response, each STA having received the poll frame and corresponding to an FDMA group may feedback a result of FDMA beamforming training previously performed on each corresponding STA to the PCP/AP.

For example, in order to request sectors received through each channel (e.g., channel 1 and channel 2) and an SNR or RSSI value of the reception time, the PCP/AP may transmit a poll feedback to STA 1. In response, STA 1 may feedback a corresponding result value to the PCP/AP.

The PCP/AP may perform the above-described procedure with terminals belonging to the FDMA group and thus be informed of both a beamforming result and information on each channel for RU allocation.

Using the feedback information, the PCP/AP may construct configuration sets to be used for FDMA transmission. For example, using the feedback information, the PCP/AP may determine candidates for performing FDAM transmission to which STAs by simultaneously how many sectors.

2.4. RU Allocation

Figure 23:
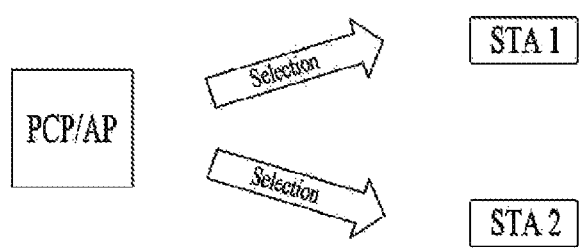
FIG. 23 is a diagram schematically showing an operation in which a PCP/AP performs RU allocation on each STA according to the present disclosure.

FIG. 23 is a diagram schematically showing an operation in which a PCP/AP performs RU allocation on each STA according to the present disclosure.

As shown in FIG. 23, using fed-back information, a PCP/AP may construct configuration sets to be used for FDMA transmission, and inform such information to STAs corresponding to an FDMA group through selection frame transmission.

In doing so, the PCP/AP may inform which STAs participate in each FDMA transmission configuration set and may, at the same time, allocate an RU indicating through which channels the respective STAs are to perform FDMA reception.

In this case, STAs finally selected according to an FDMA beamforming result may be some of STAs corresponding to an FDMA group.

Meanwhile, channel feedback, beamforming training, and resource allocation performed by terminals for the above-described FDMA transmission may be performed simultaneously.

For example, the channel feedback, beamforming training, and resource allocation performed by terminals for the above-described FDMA transmission may be performed in the following phases.

1) BRP TXSS Phase (a Process for Multi-Channel Beamforming Training and Channel Feedback)
I-TXSS subphase
Multi-channel Feedback subphase
2) FDMA Phase (a Process for FDMA Beamforming Training and Resource Allocation)
FDMA setup subphase
FDMA BF training subphase
FDMA BF Feedback subphase
FDMA BF Selection subphase An inter frame spacing (IFS) for each phase may be set to duration of SIFS*3 (MBIFS) to prevent intervention, an antenna weight vector change (AWV) time, for example, a channel measurement time, a center frequency change time, etc., from STAs which do not participate in FDMA.

When the channel feedback, beamforming training, and resource allocation performed by terminals for the above-described FDMA transmission are performed simultaneously, the PCP/AP may perform resource allocation in the FDMA setup subphase within the FDMA phase based on results of multiple channel beamforming and channel feedback, which are performed in the BRP TXSS phase.

Additionally, According to a result of FDMA beamforming performed through the FDMA BF training subphase and the FDMA BF Feedback subphase, the PCP/AP may change resource allocation in the FDMA BF Selection subphase.

Figure 24:
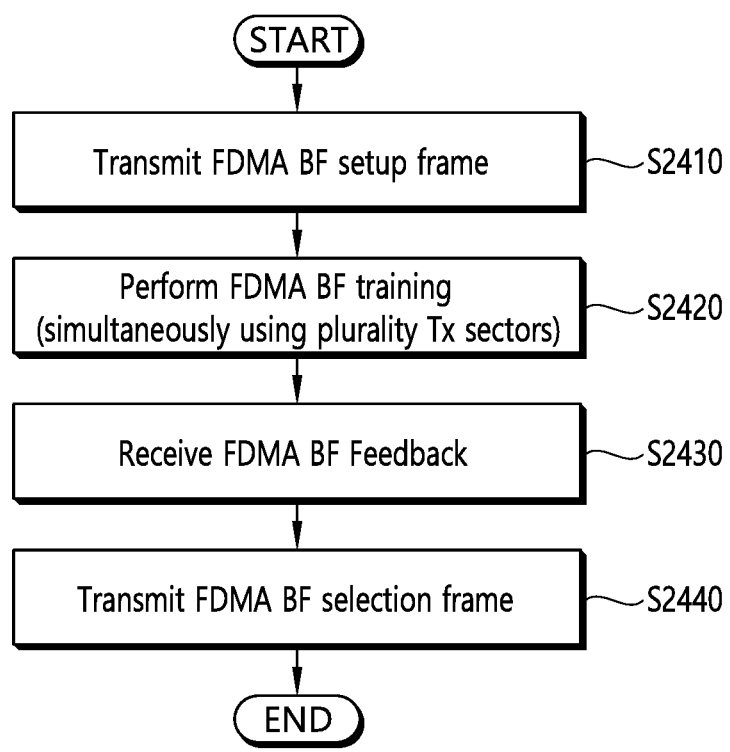
FIG. 24 is a diagram schematically showing a method for performing, by a PCP/AP, beamforming training for FDMA transmission.

FIG. 24 is a diagram schematically showing a method for performing, by a PCP/AP, beamforming training for FDMA transmission according to the present disclosure.

First, the PCP/AP transmits a beamforming setup frame (e.g., an FDMA BF setup frame) including identification information beamforming training operation information of one or more STAs to the one or more STAs in operation S2410.

In this case, the identification information of the one or more STAs may include association identifies (AIDs) of the one or more STAs or partial AIDs of the one or more STAs.

In addition, the beamforming training operation information may include beamforming training order information for each combination of multiple transmission sectors to be used simultaneously.

Additionally, the beamforming setup frame may further include training type indication information, which indicates that beamforming training performed based on the beamforming setup frame is a beamforming training process for FDMA, and channel, resource unit (RU), or bandwidth information respectively corresponding to identification information of the one or more second STAs.

Then, based on the beamforming training operation information included in the beamforming setup frame, the PCP/AP performs FDAM beamforming training by simultaneously using a plurality of transmission sectors in operation S2420.

More specifically, the PCP/AP may perform the FDMA beamforming training by transmitting a beam refinement protocol (BRP) frame including a training field.

At this point, the training field of the BRP frame may be transmitted in a duplicate mode for each channel, as shown in FIG. 20, or may be transmitted through a plurality of bonded channels, as shown in FIG. 21.

In the above configuration, beamforming training may be performed by simultaneously using a plurality of transmission sectors controlled by one RF chain or RF panel, or beamforming training may be performed by simultaneously using a plurality of transmission sectors controlled by RF chains or RF panels corresponding to the respective transmission sectors.

Then, the PCP/AP transmits a poll frame to request a feedback result of the FDMA beamforming training from the one or more STAs, and receives results of the FDMA beamforming training from the one or more STAs in operation S2430.

Then, the PCP/AP transmits a selection frame that includes FDMA transmission setup information and information on channel allocation for each STA, which are determined based on the received feedback results, in operation S2440.

At this point, the FDMA transmission setup information may include information indicating one or more STAs participating in FDMA transmission among the one or more STAs.

In addition, when a plurality of channels is allocated to a particular STA among the one or more STAs, the PCP/AP may receive a beamforming training feedback result including a feedback result for each channel allocated to the particular STA from the particular STA.

3. Device Configuration

Figure 25:
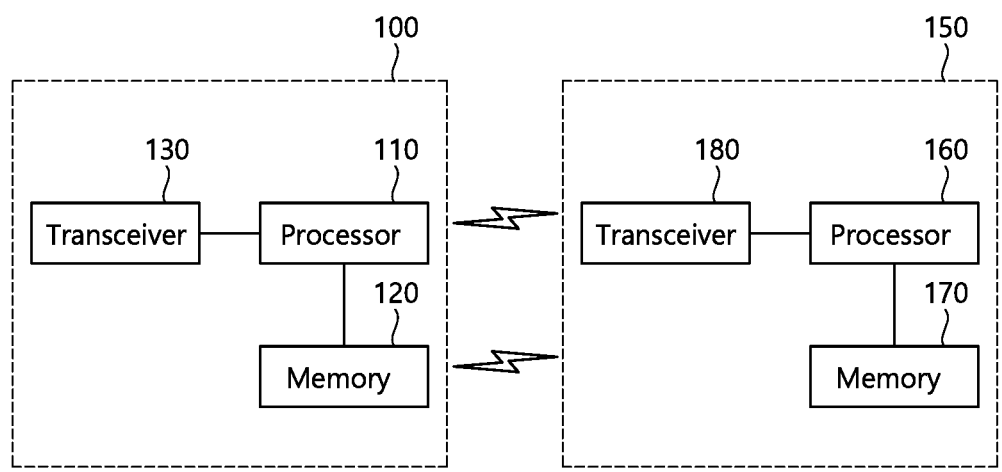
FIG. 25 is a diagram for explaining a device for implementing the aforementioned method.

FIG. 25 is a view for explaining a device for implementing the above-described method.

In FIG. 25, a wireless device 100 may correspond to a station (STA) configured to transmit a signal in the foregoing description, and a wireless device 150 may correspond to an STA configured to receive a signal in the foregoing description.

In this case, the STA configured to a signal may correspond to correspond to an 11ay terminal supporting the 11ay system or a PCP/AC, and the STA configured to receive a signal may correspond to a 11ayUE supporting the 11ay system or a PCP/AP.

Hereinafter, for convenience of explanation, the STA configured to transmit a signal is referred to as a transmitting device 100, and the STA configured to receive a signal is referred to as a receiving device 150.

The transmitting device 100 may include a processor 110, a memory 120 and a transceiver 130. The receiving device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is implemented by software, the method described above may be implemented as a module (e.g., a process, a function) that performs the functions described above. The module may be stored in the memories 120 and 170 and executed by the processors 110 and 160. The memories 120 and 170 may be located inside or outside the processors 110 and 160 and may be connected to the processors 110 and 160 by a well-known means.

The detailed description of preferred embodiments of the disclosure set forth above is provided to enable those skilled in the art to implement and practice the disclosure. Although the present disclosure has been fully described by way of example with reference to the accompanying drawings, it is to be understood that various modifications and changes may be made in the disclosure without departing from the scope and spirit of the disclosure. Accordingly, the present disclosure is not intended to be limited to the embodiments disclosed herein but is to be accorded the widest scope consistent with the principles and novel features disclosed herein.

Although it has been explained that the present disclosure is applied to IEEE 802.11 based wireless LAN system, the present disclosure may not be-limited thereto. The present disclosure may be applied to various wireless systems capable of performing data transmission based on channel bonding using the same method.

What is claimed is:

1. A method for performing, by a first station (STA), beamforming training frequency division multiple access (FDMA) transmission in a wireless Local Area Network (WLAN) system, the method comprising:
    transmitting a beamforming setup frame including identification (ID) information of one or more second STAs belonging to one FDMA group and beamforming training operation information;
    based on the beamforming training operation information, performing FDMA beamforming training by simultaneously using a plurality of transmission sectors,
    wherein the beamforming training operation information comprises beamforming training order information for each combination of the plurality of transmission sectors;
    receiving a feedback result of the FDMA beamforming training from the one or more second STAs; and
    transmitting a selection frame including FDMA transmission setup information and channel allocation information for each STA that are determined based on the received feedback result.

2. The method of claim 1, wherein the ID information for the one or more second STAs comprises association identifies (AIDs) of the one or more second STAs or partial AIDs of the one or more second STAs.

3. The method of claim 1, wherein the beamforming setup frame further comprises:
    training type indication information indicating that beamforming training performed based on the beamforming setup frame is a beamforming training process for FDMA; and
    channel, resource unit (RU), or bandwidth information corresponding to the identification information of the one or more second STAs.

4. The method of claim 1, wherein the FDMA beamforming training is performed through transmission of a beam refinement protocol (BRP) frame including a training field.

5. The method of claim 4, wherein the training field in the BRP frame is transmitted in a duplicated mode for each channel.

6. The method of claim 4, wherein the training field in the BRP frame is transmitted through a plurality of bonded channels.

7. The method of claim 4, wherein the plurality of transmission sectors to be used simultaneously is controlled through one radio frequency (RF) chain.

8. The method of claim 4, wherein the plurality of transmission sectors to be used simultaneously is controlled through RF chains corresponding thereto.

9. The method of claim 1, further comprising transmitting a poll frame to request a feedback result of the FDMA beamforming training from the one or more second STAs.

10. The method of claim 1, wherein the FDMA transmission setup information comprises information indicating one or more third STAs participating in FDMA transmission.

11. The method of claim 1, wherein the first STA corresponds to a personal basic service set central point/access point (PCP/AP).

12. The method of claim 1, wherein when a fourth STA with a plurality of channels allocated thereto is included in the one or more second STAs, a feedback result received from the fourth STA comprises feedback results for the respective channels allocated to the fourth STA.

13. A station device for performing beamforming training for frequency division multiple access (FDMA) transmission in a wireless Local Area Network (WLAN) system, the device comprising:
    a transceiver having one or more radio frequency (RF) chains and configured to transmit and receive signals with one or more other station devices; and
    a processor connected to the transceiver to process the signals transmitted and received with the one or more other station devices,
    wherein the processor is configured to:
        transmit a beamforming setup frame including identification (ID) information of the one or more other STAs belonging to one FDMA group and beamforming training operation information;
        based on the beamforming training operation information, perform FDMA beamforming training by simultaneously using a plurality of transmission sectors,
        wherein the beamforming training operation information comprises beamforming training order information for each combination of the plurality of transmission sectors;
        receive a feedback result of the FDMA beamforming training from the one or more other STAs; and
        transmit a selection frame including FDMA transmission setup information and channel allocation information for each STA that are determined based on the received feedback result.

* * * * *